United States Patent [19]

Yamaguchi

[11] Patent Number: 5,239,370
[45] Date of Patent: Aug. 24, 1993

[54] COLOR IMAGE FORMING APPARATUS HAVING COLOR-CORRECTING UNIT OPERATING IN ACCORDANCE WITH A GAMUT OF AN IMAGE INPUT MEDIUM

[75] Inventor: Toshiyuki Yamaguchi, Toyoake, Japan

[73] Assignee: Brother Kogyo Kabushiki Kaisha, Nagoya, Japan

[21] Appl. No.: 690,721

[22] Filed: Apr. 24, 1991

[30] Foreign Application Priority Data

Apr. 24, 1990 [JP] Japan ............................ 2-108061
May 29, 1990 [JP] Japan ............................ 2-139242

[51] Int. Cl.$^5$ ............................................. H04N 1/46
[52] U.S. Cl. ................................... 358/518; 358/500
[58] Field of Search ............................ 358/75-80, 358/13, 23, 28

[56] References Cited

U.S. PATENT DOCUMENTS

| | | | |
|---|---|---|---|
| 3,825,673 | 7/1974 | Schreiner et al. | 358/28 |
| 4,060,829 | 11/1977 | Sakamoto | 358/78 |
| 4,458,265 | 7/1984 | Yoshida et al. | 358/80 |
| 4,758,885 | 7/1988 | Sasaki et al. | 358/75 |
| 4,941,038 | 7/1990 | Walowit | 358/75 |
| 4,959,711 | 9/1990 | Hung et al. | 358/80 |
| 4,970,585 | 11/1990 | Kurata | 358/75 |
| 5,053,866 | 10/1991 | Johnson | 358/75 |

*Primary Examiner*—Stephen Brinich
*Attorney, Agent, or Firm*—Oliff & Berridge

[57] ABSTRACT

An image forming apparatus comprising an image inputting unit for reading the original color image on the image input medium to input an color image data of the original image therethrough, an image recording unit for recording the color image on the image output medium on the basis of the color image data, an image medium indicating unit for indicating a kind of the image input medium to output a compression-indicating signal representing a compression degree in an achromatic color direction for the input color image data, and a color-correcting unit having a color-compression unit for color-compressing the color image data of the original color image in the achromatic color direction on the basis of the compression degree indicated by the compression indicating signal every picture element to convert the color image data of the original color image to a color image data representing a recording color, the recording color being within the color-reproducible range (gamut) of the image output medium and having the same hue as the original color, and for outputting the converted color image data to said image recording means as the color image data, whereby a color-compression processing is performed.

11 Claims, 8 Drawing Sheets

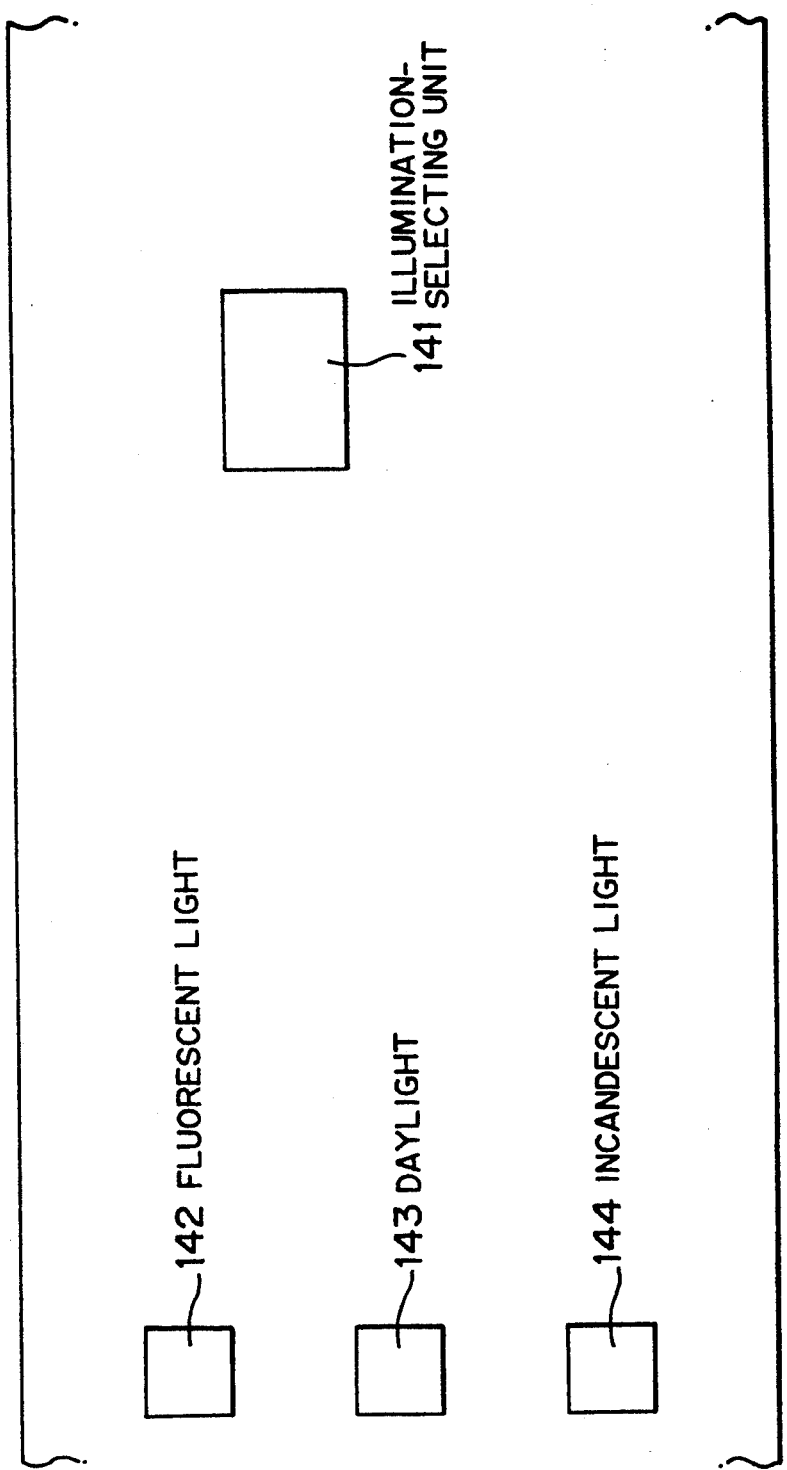

COLOR IMAGE FORMING APPARATUS HAVING COLOR-CORRECTING UNIT OPERATING IN ACCORDANCE WITH A GAMUT OF AN IMAGE INPUT MEDIUM

BACKGROUND OF THE INVENTION

This invention relates to a color image forming apparatus, and more particularly to a color image forming apparatus having a color-correcting processing.

There has been known an image forming apparatus in which an original color image on an image input medium such as a color photographic film, a television, a copy sheet or the like is read by an image reader to obtain an original image data, the original image data is separated into three color components (red, green and blue image data) for every picture element, and the original image is reproduced on the basis of the separated color image data. In such an apparatus, inconsistency in color (color error or color difference) between the original image and the reproduced image frequently occurs when a color-reproducible range (gamut) of the image input medium is inconsistent with that of an image output medium such as a copying sheet, a color television or the like. That is, a color located within the color-reproducible range (gamut) of the image input medium is not completely reproduced, and in other words, the color is reproduced with insufficient color-reproducible when the color of the image input medium is out of the color-reproducible range (gamut) of the image output medium. Here, each of the image input media and the image output media is defined as a medium on which a visible image is formed or supported. The medium is referred to as an "image input medium" when the medium is used as an original from which an original image is read out by the image reading unit, while the medium is referred to as an "image output medium" when the medium is used as a recording medium to which the original image is recorded or reproduced. When the recording medium having an image thereon is used as an original, the recording medium is referred to as an "image input medium". Therefore, various techniques (color-correcting techniques) for correcting an input color image data have been utilized to correct such a color-inconsistency (decrease such a color error) and improve the color-reproducibility of the original image.

As one of the color-correcting techniques is well known a matrix-transforming technique as described in Japanese Unexamined Published Patent Application No. 63-92166. In this matrix-transforming process, a relationship between an original color data ( a digital density or lightness data) for an original image and a reproduced color data which is spectrometrically measured by observing an reproduced image under a predetermined observing environment (illumination), is beforehand obtained and approximately represented by a polynomial function for every picture element. A coefficient of the polynomial function for each picture element is stored in a matrix form (1).

$$\begin{bmatrix} C \\ M \\ Y \end{bmatrix} = \begin{bmatrix} a11 & a21 & a31 \\ a12 & a22 & a32 \\ a13 & a23 & a33 \end{bmatrix} \cdot \begin{bmatrix} R \\ G \\ B \end{bmatrix} \quad (1)$$

Here, R, G and B represent color image data (each representing density or lightness of each color component of each picture element) of the original image, aij (i, j=1, 2, 3) represents a color-correcting coefficient for the color image data, and C, M and Y represent color-corrected image data to be outputted. The above polynomial function and the matrix form are obtained for every picture element, and finally a color-corrected image data is formed using these polynomial functions and matrix forms.

However, the above color-correcting process has the following problem. If the recorded or reproduced color image thus color-corrected is observed under an observing environment different from the predetermined observing environment which is used to obtain the color-correcting matrix forms, the color of the recorded image is visually inconsistent with the color of the original image.

As another color-correcting technique is known a color compression technique (a data-compression transform technique). In the data-compression transform technique, an original color image data which is input from an image input medium such as a photographic film, a television, an ink-printed sheet or the like, is beforehand transformed into a recordable color image data which is compressed in an achromatic (neutral) color direction, and then a color image is recorded or reproduced on an image output medium such as a copy sheet, a television, a coated or non-coated sheet or the like on the basis of the compressed color image data.

The achromatic color is defined as a color having a lightness, but no hue and chromaticity (saturation). White, gray and black colors belong to the achromatic color, and are decreased in lightness in this order. In the following description, a color axis on which achromatic colors having various lightnesses (white, gray and black) are located is referred to as an "achromatic color axis". Further, the achromatic color direction is defined as a direction in which any color is directed to an achromatic color on the achromatic axis in a color space. As described below, the color-compression transforming process is a data-correcting process for shifting (color-compressing) a color within the color-reproducible range (gamut) of an image input medium to a color within the color-reproducible range (gamut) of an image output medium in the color space.

An image forming apparatus adopting the above color-compression technique includes an image reading system for reading out an original image from an image input medium such as a sheet, a photographic film, a color television or the like to form an original color image data, a color-compression transforming system for transforming the original color image data into the compressed color image data in an achromatic color direction, a matrix-transforming system for conducting a matrix-transforming process on the compressed color image signal to form a printer control signal which is used to sufficiently approximate a color of the reproduced color image to a color of the original image, and a recording system for recording or reproducing the color image from the printer control signal on an image output medium such as a copy sheet, a television or the like.

FIG. 1 shows color-reproducible ranges of various general image input and output medium such as a photographic color film, a television, an ink jet, a color print and so on in a chromaticity diagram of CIE-XYZ (CIE 1931 standard) colorimetric system. The color-reproducible ranges of the image input and output medium are defined as areas outlined by a solid line, a dotted line and so on in the chromaticity diagram as shown in FIG. 1. In the chromaticity diagram, an achromatic color is represented by a point C ($x=0.33$, $y=0.33$), and is located on the achromatic color axis. The achromatic color axis extends in a direction vertical to the X-Y plane of the chromaticity diagram, and has both ends representing white and black color. The achromatic color on the achromatic color axis is shifted up to the white color as a lightness thereof is increased, and down to the black color as the lightness is decreased.

As is apparent from FIG. 1, the color-reproducible ranges of the image input and output media are different in accordance with kinds of the image input and output media. Accordingly, in order to record or reproduce an original image whose color is within a color-reproducible range of the image input medium, but is out of a color-reproducible range (gamut) of the image output medium, it is necessary to correct a color image data of the original image such that the color of the original image is shifted to a suitable color within the color-reproducible range (gamut) of the image output medium in the chromaticity diagram (color space). In general, the original image data is corrected such that the color of the original image is shifted toward a point on the achromatic color axis and is located at a point within a color-reproducible of the image output medium. This color-correcting process is hereinafter referred to as "a color-compression process in an achromatic color direction". In the conventional image forming apparatus adopting the above color-compression process, a color-correcting data with which an input image data is color-corrected, is beforehand determined to an invariable data by a predetermined rule, and is beforehand stored in a memory of the apparatus.

Therefore, in the conventional image forming apparatus adopting the color-compression process, there frequently occurs that the data-compression process (color-correcting process) can not be sufficiently performed for some kinds of the image inputting systems because the invariable data is determined using a particular image inputting or output medium, and the reproduced color is inconsistent in hue or lightness with the original color when the original color is out of the color-reproducible range (gamut) of the image output medium (that is, the color-reproducible range gamut) of the image input medium is inconsistent with that of the image output medium).

Further, in the conventional image forming apparatus, even if the color-reproducible range (gamut) of the image input medium is consistent with that of the image output medium, the color-inconsistency between the original image and the reproduced image may occur when the reproduced image is observed under an observing environment such as illumination different from an observing environment for the original image.

SUMMARY OF THE INVENTION

An object of this invention is to provide an image forming apparatus capable of reproducing a color image having a color out of the color-reproducible range (gamut) of an image output medium with sufficient color-reproducible.

Another object of this invention is to provide an image forming apparatus capable of reproducing a color image having substantially the same color as an original image even if an observing environment such as illumination is different between the original image and the reproduced image.

In order to attain the above object, a color image forming apparatus according to one aspect of this invention in which an original color image on an image input medium having a first color-reproducible range (gamut) is read out to obtain a color image data representing an original color of the original color image for every picture element and then a color image is formed on an image output medium having a second color-reproducible range (gamut) on the basis of the color image data, comprises image inputting means for reading the original color image on the image input medium to input an color image data of the original image therethrough, image recording means for recording the color image on the image output medium on the basis of the color image data, image medium indicating means for indicating a kind of the image input medium to output a compression-indicating signal representing a compression degree in an achromatic color direction for the input color image data, and color-correcting means having a color-compression unit for color-compressing the color image data of the original color image in the achromatic color direction on the basis of the compression degree indicated by the compression indicating signal for every picture element to convert the color image data of the original color image to a color image data representing a recording color, the recording color being within the color-reproducible range (gamut) of the image output medium and having the same hue as the original color, and for outputting the converted color image data to said image recording means as the color image data, whereby a color-compression processing is performed.

The image forming apparatus further includes observing environment selecting means for indicating an observing environment under which the recorded color image on the image output medium is observed, to output a signal representing a color-correction degree for the input color image data to said color-correcting means. According to the observing environment selecting means, even if the recorded image is observed under an observing environment different from that of the original image, the recorded image is visually observed as having the same color as the original image.

BRIEF DESCRIPTION OF THE DRAWINGS

FIG. 9 shows an operation panel having an illumination-selecting unit.

DETAILED DESCRIPTION OF THE INVENTION

Preferred embodiments of this invention will be described hereunder with reference to the accompanying drawings.

Figure 1:
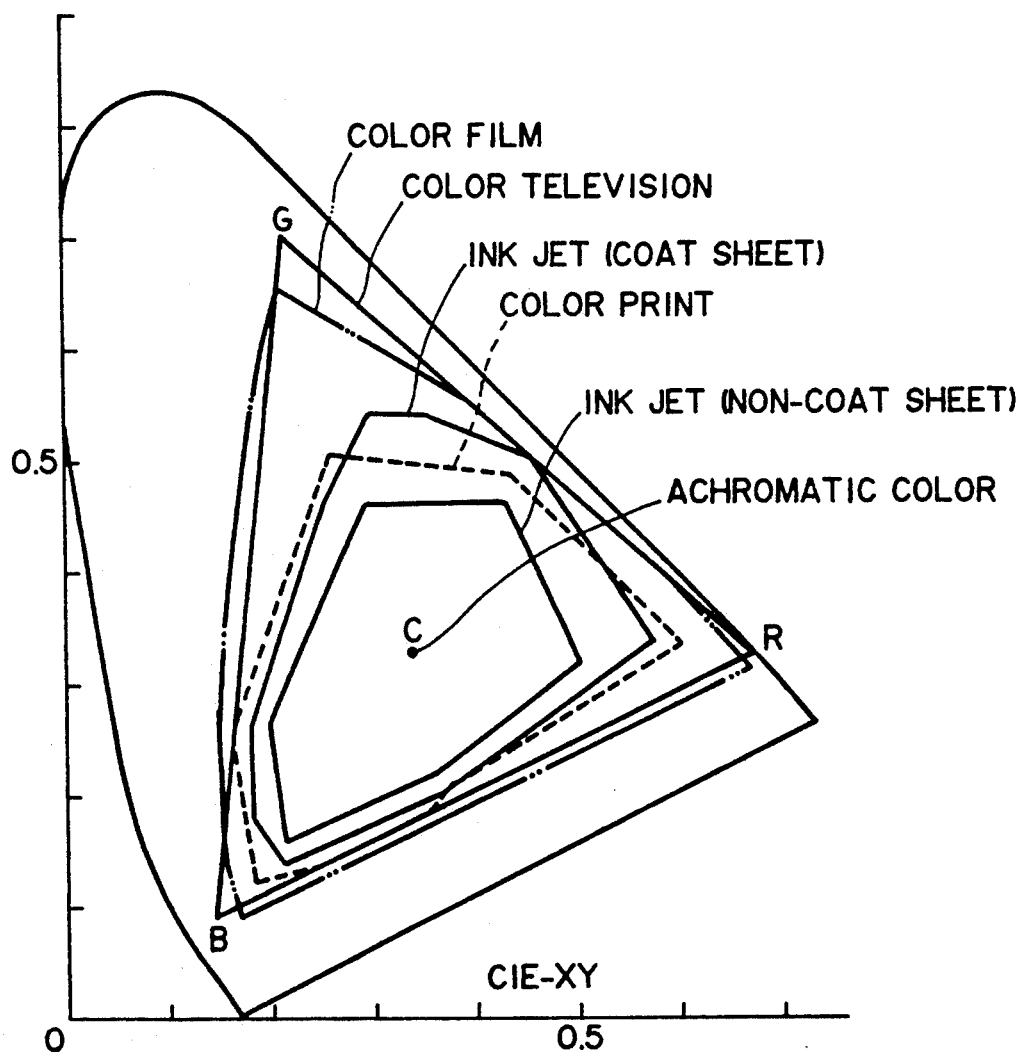
FIG. 1 shows color-reproducible ranges of various image inputting systems in a chromaticity diagram.
Figure 2:
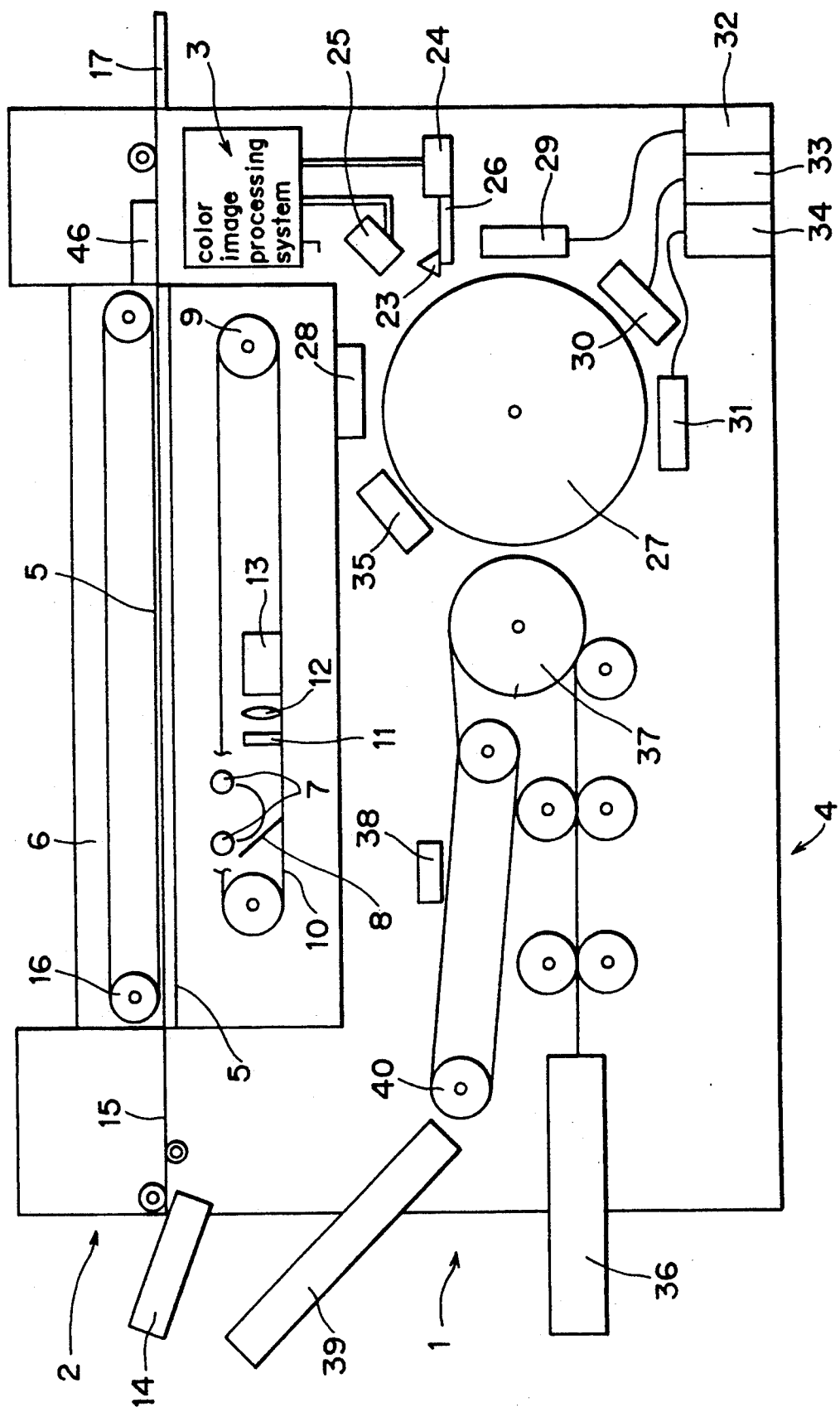
FIG. 2 shows an embodiment of an image forming apparatus of this invention.

FIG. 2 shows an embodiment of an image forming apparatus of this invention. The image forming apparatus of this embodiment comprises a digital color copying machine 1, and includes an original color image reading system 2 provided at an upper side of the copying machine 1, a color image processing system 3 provided at a right side of the copying machine 1, and a color image recording system 4 provided at a lower side of the copying machine 1.

The original color image reading system 2 includes a transparent original mount 5 for mounting an original thereon, an original cover 6 for pressingly covering the original mounted on the original mount 5, an original supply stand 14 for supplying the original to the original mount 5, an original supply unit 15 provided at a right side of the original supply stand 14 for supplying the original from the original supply stand 14 to the original mount 5, an original feeding unit 16 which comprises two rollers rotated by a motor (not shown) and an endless belt suspended therebetween for feeding the original through the original mount 5 at a constant speed, an original discharge tray 1 provided at a right side of the original feeding unit 16 for withdrawing an exposed original, and an image reading unit provided at a lower portion of the system 2 for exposing the original to light to obtain an original color image data from the original.

The image reading unit 2 includes two light sources (e.g. fluorescent lamps) 7 each extending in a traversing direction to the original for emitting light toward the transparent original stand 5 and irradiating the light to the original fed on the original mount 5 while scanning the original. a movable reflection mirror 8 for reflecting an original image light reflected from the original, a lens 11 for converging the original image light from the reflection mirror 8, a color filter 12 for separating the original image light from the lens 11 into three (red, green and blue) color image components, and a solid-state image pick-up element (e.g. a line charge-coupled device (line CCD)) 13 provided behind the color filter 12 for receiving the original image light having the separated three color components and forming an original color image data on the basis of the original image light. If the solid-state image pick-up element 13 comprises a line CCD, the line CCD reads out an image information for every line in a width direction of the original (vertically to the drawing). The movable reflection mirror 8, the lens 11, the color filter 12 and the solid-state image pick-up element 13 are mounted on a movable stand 10 which is moved by a moving unit 9 such as a rotatable roller in right and left directions (horizontally in FIG. 2).

Figure 3:
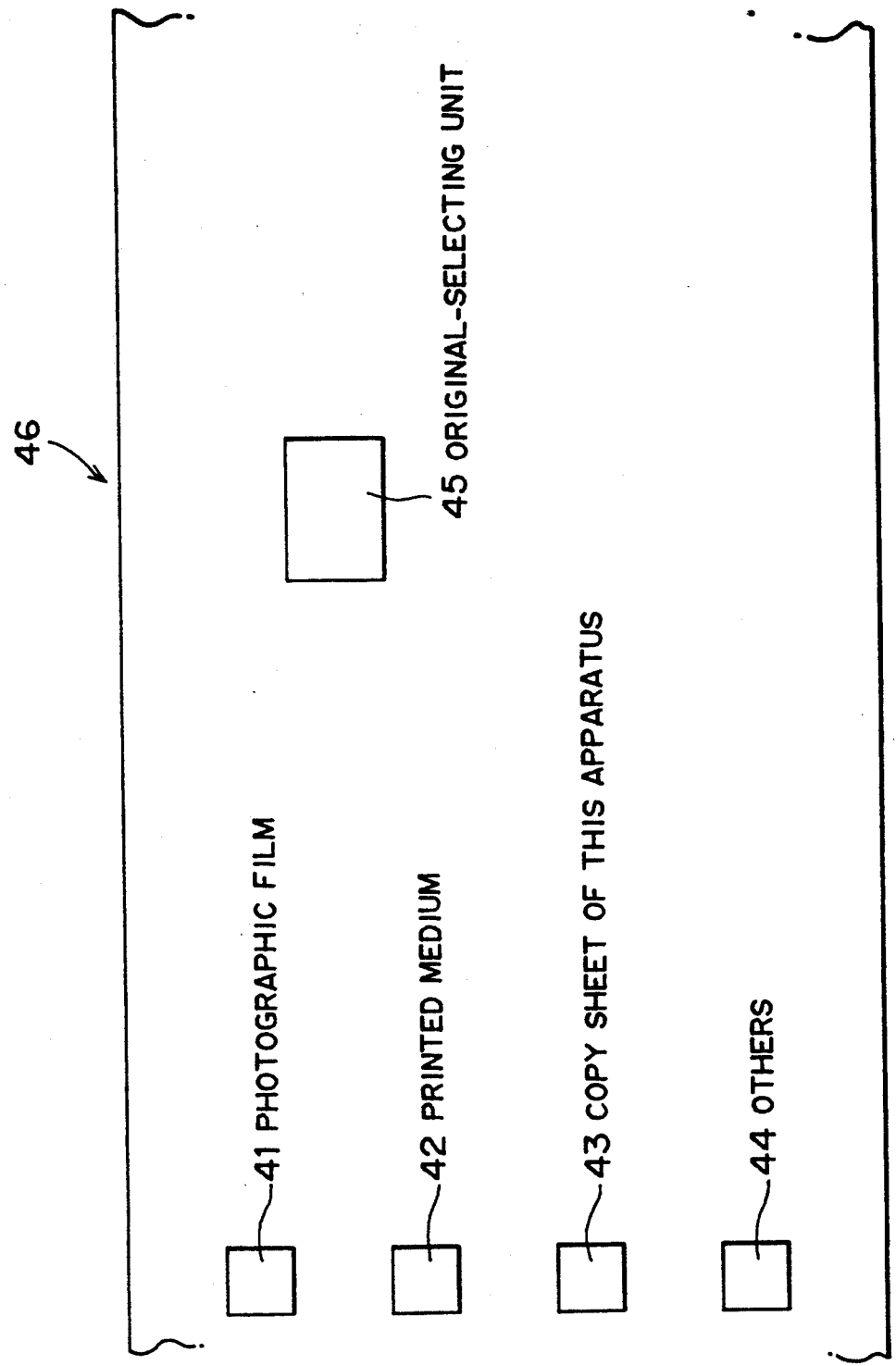
FIG. 3 shows an operation panel having an original-selecting unit.

At a right side of the original cover 6 is provided an operation panel 46 having a copy starting switch or button 45 and various original-selecting switches or buttons such as a photographic original switch or button 41, a printed original switch or button 42, a copy sheet switch or button 43 and other switches or buttons as shown in FIG. 3. Through the original-selecting switches or buttons, a compression-indicating signal representing a compression degree in an achromatic direction for the input color image data is generated.

Figure 4:
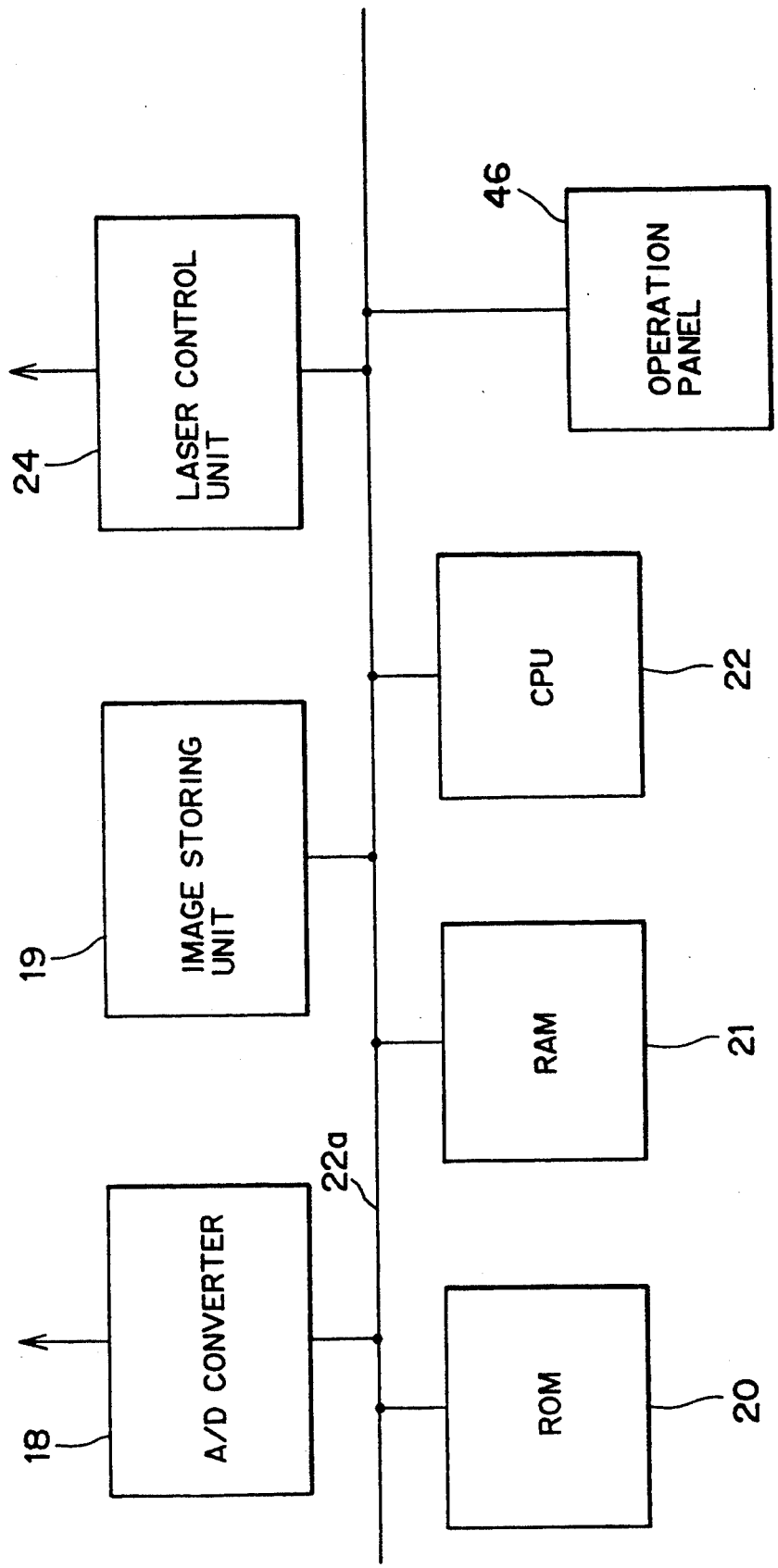
FIG. 4 is a block diagram for showing a color image processing system.

FIG. 4 is a block diagram for showing the color image processing system 3.

As shown in FIG. 4, the color image processing system 3 comprises an analog-to-digital (A/D) converter 18 for converting the original color image data of the solid-state image pick-up element 13 into a digital color image data, an image storing unit such as an image memory or a frame memory 19 for storing all or a part of the original color image data in a digital form, a ROM 20 for storing therein a table indicating color-reproducible ranges for various kinds of image input media (originals) and the image output media (media on which an original image is formed), an another table indicating a color-reproducible range of the image forming apparatus itself, color-correcting coefficients which are beforehand determined to perform a sufficient color reproduction for a color within a color-reproducible range (gamut) of the color image recording system 4, a RAM 21 for storing various data indicating various processing results, a CPU 22 for performing various image processing using the RAM 21, and a laser control unit 24 for generating a laser driving signal on the basis of a color-corrected image data to control the driving of a laser source 23 such as a laser diode of the image recording system 4. These elements are connected to one another through a bus 22a, and further connected to the operation panel 46 through the bus 22a.

The image pick-up element 13 is successively covered by the filter unit 12 to successively pass one of red, green or blue color components to the image pick-up element 13 every image reading operation of one line or one frame, so that image signals each representing lightness of each of three color components of each picture element is outputted from the image pick-up element 13 for every picture element. Each of the outputted three image signals of each picture element represents a lightness, and a group of the outputted image signals of the three color components of each picture element constitutes a color data of lightness, hue and saturation of each picture element. The outputted image signals are converted into digital image signals by the A/D converter 18, and stored in the image storing unit 19.

The color image recording system 4 includes the laser diode 23 for emitting a laser beam, a laser modulation unit 26 for modulating the laser beam of the laser diode 23 on the basis of the laser driving signal from the laser control unit 24 and supplying the modulated laser beam to a polygon mirror 25, an electrophotographical image forming unit for electrostatically forming a latent image thereon through an exposing operation using the modulated laser beam which is reflected from the polygon mirror 25 and then forming a visible image corresponding to the latent image on a recording sheet with toners, a fixing unit 38 for fixing the visible image on the sheet, and a sheet feeding unit 40 for discharging the fixed sheet to a discharge tray 39.

The electrophotographic image forming unit includes a photosensitive drum 27 on which the latent image is electrophotographically formed by the modulated laser beam from the polygon mirror 25, a charging unit 28 provided near to the photosensitive drum 27 for charging the photosensitive drum 27 homogeneously negatively or positively before the exposing operation, a developer unit for coating the latent image with color toners to form a toner image on the photosensitive drum 27, the developer unit comprising a cyan developer 29 for coating cyan toners to a latent image which has been formed on the basis of a cyan color image data, a magenta developer 30 for coating magenta toners to a latent image which has been formed on the basis of a magenta color image data and a yellow developer 31 for coating yellow toners to a latent image which has been formed on the basis of a yellow color image data, a toner supply unit comprising a cyan toner tank 32 for supplying the cyan toners to the cyan developer 29, a magenta toner tank 33 for supplying the magenta toners to the magenta developer 30 and a yellow toner tank 34 for supplying the yellow toners to the yellow developer 31, a cleaner 35 provided near to the photosensitive drum 27 for removing undesired toners on the photosensitive drum 27 after a transfer process, and a transfer drum 37 for transferring the toner images of cyan, magenta and yellow on the photosensitive drum 27 to a recording sheet which is supplied from a sheet supply case 36.

A color image forming operation of the digital color image copying machine of this embodiment will be next described.

First, the kind of an original (an image inputting system) to be copied is selected by pushing one of the original-selecting buttons 41 to 44 on the operation panel 46, and then the copy starting button 45 is pushed.

In response to the pushing operation of the copy starting button 45, a color original on the original stand 14 is fed to the transparent original mount 5 by the original feeding unit 16 (the original may be manually laid on the original mount 5 by opening the original cover 6). Thereafter, a white light is irradiated from the light sources 7 to the original mount 15 while scanned on the original in a auxiliary scanning direction by the moving unit 9, and is reflected from the movable reflection mirror through the lens 11 and the filter unit 12 to the image pick-up unit 13, in which an original image light is converted into an electrical signal. A switching operation among the red, green and blue filters in the filter unit 12 is carried out for every line or frame, and in other words the red, green and blue filters are supplied in front of the solid-state image pick-up element 13 in this order for every line or frame of the original.

The analog image signals for picture elements obtained by the solid-state image pickup element 13 are converted into digital image signals for every picture element ( hereinafter, a picture element to be subjected to a color correction is referred to as "a noted picture element") in the A/D converter 18, and then the digital image signals are stored in the image storing unit 19.

Figure 5:
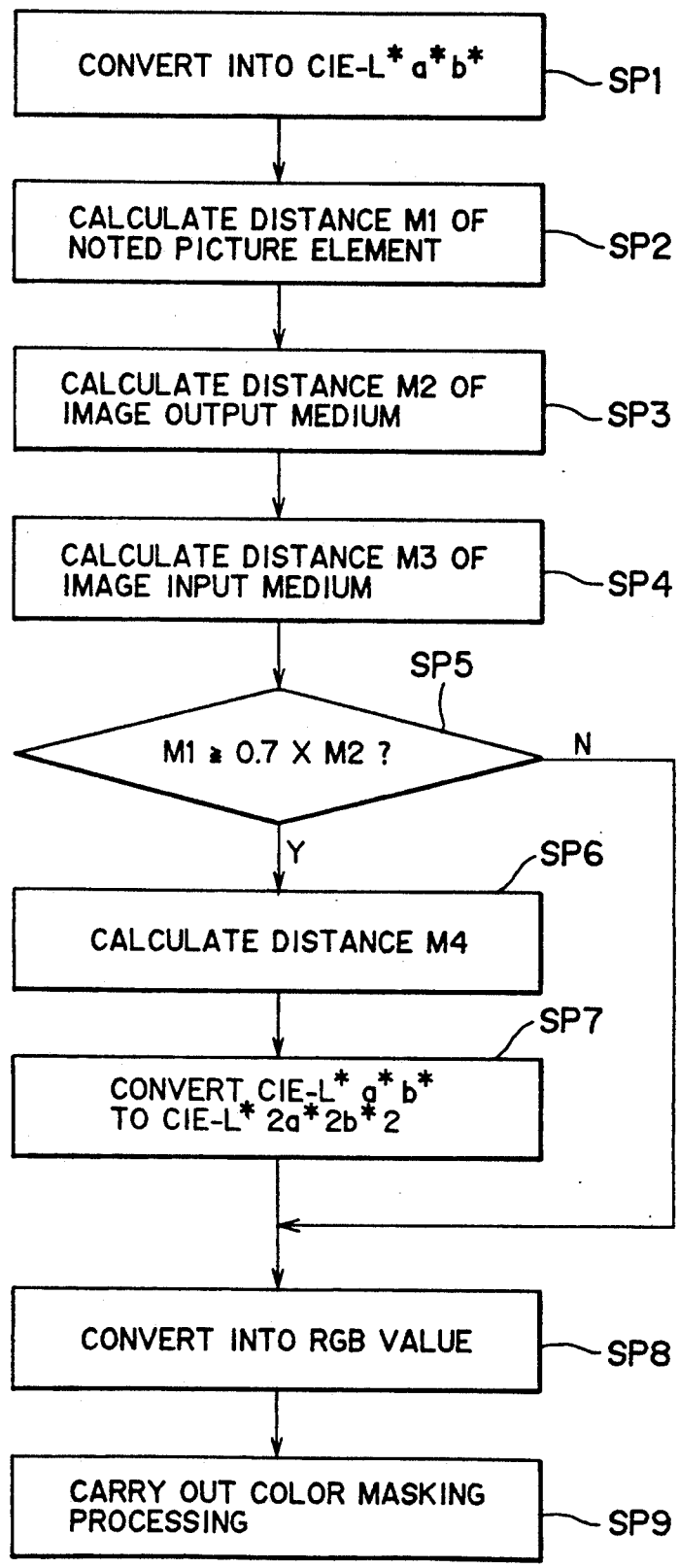
FIG. 5 is a flow chart for showing a color-correcting process.

FIG. 5 is a flow chart for showing the color-compression processing of this embodiment.

The digital color signals of the noted picture elements are subjected to the following color-compression processing by the CPU 22 for every picture element. In a step SP1, a digital signal of a noted picture element is converted to a value in a CIE 1976 colorimetric system L*a*b* colorimetric system). If a Luther condition as disclosed by J.A.C. Yule, "Principle of Color Reproduction" is satisfied for the image reading unit, input color signals (RGB color signals) of a picture element from the image input medium can be linearly converted into a value in a CIE 1931 standard colorimetric system (XYZ colorimetric system). For example, if transforming coefficients of this transforming processing are represented by the following matrix (2), an input image data (R, G, B), for example, (80, 70, 5) which is input from through the image reading system 2 and normalized to 0 to 100, is converted to (61.74, 65.58. 10.2) in the CIE 1931 standard colorimetric system.

$$\begin{bmatrix} X \\ Y \\ X \end{bmatrix} = \begin{bmatrix} 0.6067 & 0.1736 & 0.2001 \\ 0.2988 & 0.5868 & 0.1144 \\ 0.0661 & 1.115 & 0.0 \end{bmatrix} \cdot \begin{bmatrix} R \\ G \\ B \end{bmatrix} \quad (2)$$

Further, the value (X, Y, Z) in the CIE 1931 colorimetric system can be converted into a value ( L*, a*, b*) in the CIE 1976 L*a*b* colorimetric system using the following equations. The value (61.74, 65.58. 10.2) in the CIE 1931 standard colorimetric system is converted to a value (84.78, −1.38, 82.93) in the CIE 1976 L*a*b*.

$$L^* = 116 \times (Y/Yn)^{\frac{1}{3}} - 16 \quad (3)$$

$$a^* = 500 \times ((X/Xn)^{\frac{1}{3}} - (Y/Yn)^{\frac{1}{3}}) \quad (4)$$

$$b^* = 200 \times ((Y/Yn)^{\frac{1}{3}} - (Z/Zn)^{\frac{1}{3}}) \quad (5)$$

Here, Xn, Yn and Zn are three values of the CIE 1931 standard colorimetric system for a perfect diffusion surface. For example, the value (61.74, 65.58. 10.2) in the CIE 1931 standard colorimetric system is converted to a value (84.78, −1.38, 82.93) in the CIE 1976 L*a*b* colorimetric system.

Next, in a step SP2, a distance M1 (color difference) from a color of the noted picture element to a color having a desired lightness on the achromatic color axis (hereinafter referred to as "desired achromatic color") in the CIE 1976 L*a*b* colorimetric system is obtained using the following equation.

$$M1 = ((L^* - L^{*\prime})^2 + a^{*2} + b^{*2})^{\frac{1}{2}} \quad (6)$$

Here, L*' is a L* value of the desired achromatic color in the CIE 1976 L*a*b* colorimetric system, and generally is 50 to 60 (in this embodiment, 60 is used as the L*'). The coordinate of the achromatic color is (L*', 0, 0).

In a step SP3, a distance M2 (color difference) from the desired achromatic color to a color which is at the boundary of the color-reproducible range (gamut) of the image outputting (recording) medium and which has the same hue and lightness direction to the desired achromatic color as those of the color of the noted picture element to the desired achromatic color. The distance M2 is beforehand obtained by the following equations (7) to (9), and stored in a table1 of the ROM 20. Therefore, the distance M2 is automatically read out of the ROM 20.

$$\theta = \arctan ((L^* L^{*\prime})/(a^{*2} b^{*2})^{\frac{1}{2}}) \quad (7)$$

$$\phi = \arctan (b^*/a^*) \quad (8)$$

$$M2 = \text{table1} (\theta)(\phi) \quad (9)$$

Using the above equations, 14 degrees and 91 degrees are obtained for the above CIE1976 L*a*b* colorimetric system, and thus the M2 is 80.

Figure 6:
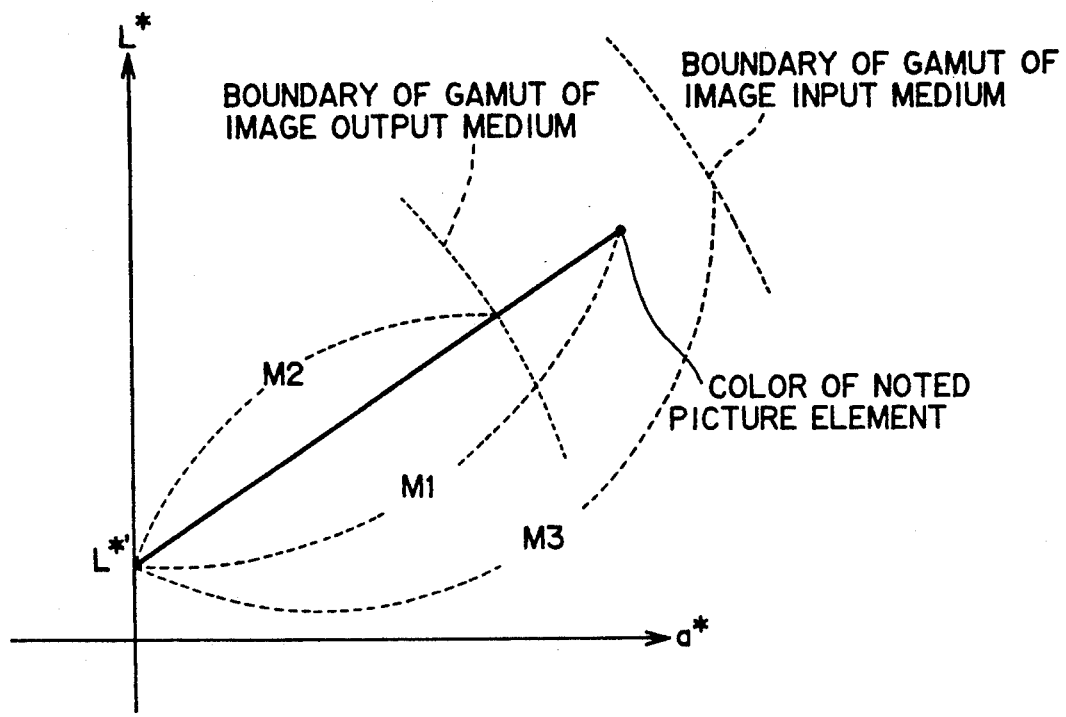
FIG. 6 is a schematic diagram for showing a distance from a color of a noted picture element to an achromatic color on an achromatic color axis.

In a step SP4, a distance M3 (color difference) from the desired achromatic color to a color which is at the boundary of the color-reproducible range (gamut) of the image inputting system selected by one of the original-selecting buttons 41 to 44 and which has the same hue and lightness direction to the desired achromatic color as those of the color of the noted picture element to the desired achromatic color. The distance M3 is also before-hand obtained by the above equations (7) to (9), and stored in a table2 of the ROM 20. Therefore, the distance M2 is automatically read out of the ROM 20. The value M3 is changed in accordance with the kind of the image input medium. For example, for 14 degrees of h and 91 degrees of φ, a photographic original, a printed original and a copy sheet of this image forming apparatus are 130, 120 and 80, respectively. FIG. 6 is a schematic diagram for showing the relationship between the distances M1, M2 and M3 in the CIE 1976 L*a*b* colorimetric system.

Figure 7:
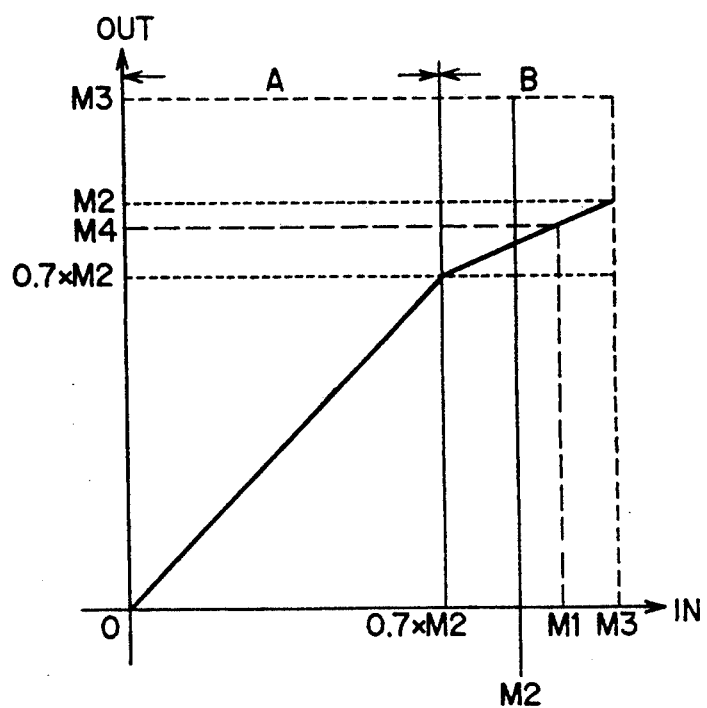
FIG. 7 is a schematic diagram for showing a color-compression transforming of the noted picture element.

FIG. 7 is a schematic diagram for showing a color-compression relationship. In a step SP5, it is judged that the color of the noted picture element is located within a color-reproducible range (gamut) A which has a distance from 0 to a predetermined distance (color difference). In this embodiment, the predetermined distance is preferably set to 0.7×M2. If it is judged that the color of the noted picture element is within the color-reproducible range (gamut) A, a color-compression processing is not conducted on the noted picture element. On the other hand, if it is judged that the color of the noted picture element is out of the color-reproducible range A (that is, within a color-reproducible range (gamut) B), the noted picture element is subjected to the following color-compression processing to obtain a new distance M4 from the color-compressed (color corrected) color of the noted picture element to the achromatic color.

$$M4 = M2 - ((0.3 \times M2)/M3 - 0.7 \times M2)) \times (M3 - M1) \quad (10)$$

For example, a value of 72 is obtained for the photographic original.

In a step SP7, a value of (L*, a*, b*) in the CIE 1976 L*a*b* colorimetric system for the noted picture element which needs the color-compression processing is renewed to the following value of (L*2, a*2, b*2) in the CIE 1976 L*a*b* colorimetric system.

$$L^*2 = (L^* - L^{*\prime}) \times m4/m1 + L^{*\prime} \quad (11)$$

$$a^*2 = a^* \times M4/M1 \quad (12)$$

$$b^*2 = b^* \times M4/M1 \quad (13)$$

Using the above equations, a final color-impressed value of (82.2, 1.24, 74.64) in the CIE 1976 L*a*b* colorimetric system is obtained. In a step SP8, this final color-compressed value is reconverted to a color-compressed RGB image data (this color-compressed RGB image data has the same hue as the original RGB image data), and in this case a value of (75.73, 63.85, 6.63) is obtained.

In a step SP9, the color-compressed RGB image data is subjected to a matrix-transforming processing (a color-masking processing) to obtain printer control signals for cyan, magenta and yellow colors. Matrix-transforming coefficients for the matrix-transforming processing are represented by the following matrix.

$$\begin{bmatrix} C \\ M \\ Y \end{bmatrix} = \begin{bmatrix} a11 & a21 & a31 \\ a12 & a22 & a32 \\ a13 & a23 & a33 \end{bmatrix} \begin{bmatrix} R \\ G \\ B \end{bmatrix} \quad (14)$$

Here, C, M and Y represent the printer control signals for the cyan, magenta and yellow colors, respectively.

For example, if the following coefficients are adopted, the above color-compressed RGB image data is (92.58, 82.76, 1.24).

As described above, the CPU 22 includes a CIE-L*a*b* converter for converting input RGB values into values of the CIE-L*a*b* (step SP1), a color-difference calculating means for obtaining the color-differences (distances) M1, M2 and M3 (Steps SP2 to 4) a judging means for judging whether or not the color-difference M1 with a predetermined color-difference (0.7×M2) (step SP5), a corrected color-difference calculating means for obtaining the corrected color-difference M4 (step SP6), a CIE-L*2a*2b*2 converter for converting the values of the CIE-L*a*b* into corrected values of the CIE-L*2a*2b*2 (step SP7), a RGB-converter for converting the corrected values of the CIE-L*2a*2b*2 into RGB values (Step SP8), and a color masking means for performing a color masking processing (step SP9)

$$\begin{bmatrix} C \\ M \\ Y \end{bmatrix} = \begin{bmatrix} 1.4 & -0.2 & -0.1 \\ -0.15 & 1.5 & -0.25 \\ -0.03 & -0.08 & 1.3 \end{bmatrix} \cdot \begin{bmatrix} R \\ G \\ B \end{bmatrix} \quad (15)$$

The color-masking processing will be described hereunder.

Figure 8:
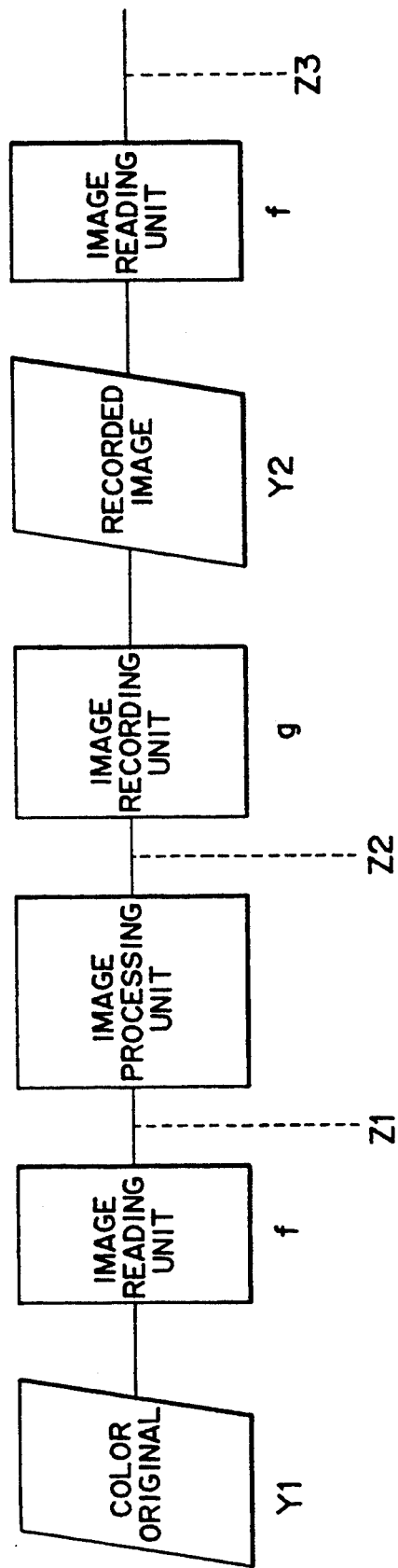
FIG. 8 is a block diagram for showing a color masking processing.

FIG. 8 is a block diagram for showing the color-masking processing.

In FIG. 8, Y1 represents a color of an original color image; Y2, a color of a recorded original image; Z1, a color image data (R, G, B) which is read out of the color original image by the color image reading unit 2, Z2, a printer control signal (C, M, Y) which is color-corrected by the color image processing unit 3; Z3 represents a color image data (R, G, B) which is read out of the recorded color image by the image reading unit 2; g, a matrix representing a optical characteristic of the color image recording unit 4; and f, a matrix representing an optical characteristic of the color image reading unit 2.

When a color original image is copied, Y1 is equal to Y2. However, if the Luther condition is satisfied for the color image reading unit 2, Z1 is equal to Z3. Here, Y2=g(Z2) and Z3=f(Y2), and thus Z3=f(g(Z2)) and Z2=g$^{-1}$(f$^{-1}$(Z3)). Here, representing g$^{-1}$(f$^{-1}$(Z3)) by a matrix I, Z2=I(Z1).

The matrix coefficients aij in the color-masking processing are obtained using the method of least squares. It is assumed that Tij represents a printer control signal which is beforehand determined, and Xij represents three color components of red, green and blue (R, G, B) which are input by the color image reading unit 2 based on a color image obtained on the printer control signal Tij (i=R, G, b; k=1,2,3..., n).

$$Tjk = \sum_{i=1}^{3} aijXjk \quad (16)$$

By calculating aij to satisfy the above equations, a most suitable matrix aij is obtained, and thus a most suitable color-reproducibility is obtained. Representing a difference between left and right side members by ejk, $$ejk = Tjk - \sum_{i=1}^{3} aijXik \quad (17)$$

Here, representing a sum of square of the ejk by Fj, $$Fj = \sum_{k=1}^{k=n} ejk^2 = \sum_{k=1}^{k=n}\left(Tjk - \sum_{i=1}^{i=3} aijXik\right)^2 \quad (18)$$

In order to obtain aij which provides a minimum value of Fj, the both side members of the equation (18) are partially differentiated by al as follows. Here, al is a representative value of aij.

$$Fj/al = -2\sum_{k=1}^{k=n}\left\{\left(Tjk - \sum_{i=1}^{i=3} aijXik\right)Xik\right\} = 0 \quad (19)$$

$$\sum_{k=1}^{k=n} TjkXik = \sum_{k=1}^{k=n}\sum_{i=1}^{i=3} aijXikXik \quad (20)$$

$$\sum_{k=1}^{k=n} TjkXjk = \sum_{i=1}^{i=3}\left\{aij\left(\sum_{k=1}^{k=n} XikXik\right)\right\} \quad (21)$$

Solving the above simultaneous linear equation, the most suitable aij is obtained.

Xik is obtained as follows. First printer control signals for patches within a rectangular area which is composed of Tjk values are input to the color image recording unit 4 to record color patches in accordance with the input printer control signals. The recorded color patches are subjected to a colorimetric measurement by the color image reading unit 2 to obtain tristimulus values which correspond to Xik values. It is preferable that the number of the color patches is large. Particularly, the number of the color patches is set to 216 ($6^3$).

The printer control signal thus color-corrected every picture element is supplied to the laser control 24. A laser beam is emitted from the laser source 23 while modulated on the basis of the control signal, and reflected from the polygon mirror 25 to the photosensitive drum 27 which is homogeneously charged, thereby forming a latent image on the photosensitive drum 27. The latent image is developed by at least one of the cyan developer 29, the magenta developer 30 and the yellow developer 31 in accordance with the color (red, green and blue) image data to be attached with at least one of toners of cyan, magenta and yellow. Thereafter, the recording sheet supplied form the sheet case 36 is wound around the peripheral surface of the transfer drum 37, and a toner image on the photosensitive drum 27 is transferred to the recording sheet on the transfer drum 37. The remaining toner on the photosensitive drum 27 is removed by the cleaner 35. The recording sheet having the transferred toner image is heat-fixed by the heating unit 38 in the sheet feeding unit 40, and then discharged to the discharge tray 39.

The image forming apparatus of this invention is not limited to the above embodiment, and various modifications may be made without departing from the subject matter of this invention. For example, in the above embodiment, a color masking method is adopted in the color-correcting processing, however, a color-correction method using a look-up table including the color-compression portion as described above and a interpolating processing may be used.

Next, a color-correcting process in a case where a recorded or reproduced color image is observed under a different observing environment (illumination) will be described.

FIG. 9 shows an observing environment selecting system for selecting one of various different observing environments, under which the recorded or reproduced image is observed. In this embodiment, an illumination such as a fluorescent light, a daylight, an incandescent light or the like is considered as the observing environment. However, other observing environments may be adopted. The observing environment selecting system may be provided on the operation panel 46 as shown in FIG. 2 together with the original-selecting buttons 41 to 45, or may be independently provided on another operation panel.

The observing environment selecting system (hereinafter referred to as "illumination selecting system") as shown in FIG. 9 comprises an illumination selecting key 141 for selecting one of various illuminations such as a fluorescent light, a daylight, and an incandescent light to thereby output a signal representing a color-correcting degree for the input color image data in the matrix-transforming processing, and lamps 142, 143 and 144 for indicating the selected light. The lamps 142, 143 and 144 are lighted for the selection of the fluorescent light, the daylight and the incandescent light, respectively.

First, an observing illumination for a recorded or reproduced color image is beforehand determined by the illumination selecting key 141. If the observing illumination is completely satisfied with one of the fluorescent light, the daylight and the incandescent light, one of these lights which is most similar to the observing illumination may be selected. When one of the fluorescent light, the daylight and the incandescent light is selected, the color-correcting coefficients for the selected illumination is read out of the ROM 20, and then stored in the RAM 21.

Next, a density data (lightness data) of each color component (R, G and B) is read out of the image storing 19 every picture element. The read-out brightness data R, G and B are subjected to a color-correcting process as described above.

The color-corrected image data C, M and Y are substituted for the color image data R, G and B before subjected to a color-correcting process, and stored in the image memory 19.

As described above, the color-correcting coefficients aij are determined by comparing a color image data input to the laser control 24 with a spectroscopically-measured data of light which is reflected from a reproduced color of the color image data under the selected illumination. For example, the aij may be beforehand determined with a method of least squares so that an original color sample and a reproduced color are visually consistent with each other by adjusting input and output characteristics of the apparatus (for example, adjusting (increasing or decreasing) an amount of each of color toners to be attached to the photosensitive drum individually).

The color-corrected image data C, M and Y are transmitted from the image memory 19 to the laser control unit 24, and the color image forming process as described above is carried out.

In this embodiment, the color correction can be automatically performed in accordance with an observing environment. For example, a yellow component (toner) is automatically more reduced in amount for a color image to be observed in a room under an incandescent light than in a room under a fluorescent light, so that the recorded or reproduced color image having the same color as an original image can be obtained.

In the embodiments as described above, the digital color copying machine is used as an image forming apparatus. However, a color printer having no image reading system may be used.

According to the image forming apparatus of this invention, a recorded or reproduced color image having the same color as an original image even though a color-reproducible range of an image input medium is inconsistent with that of an image output medium. Further, under different observing environments such as illuminations, the same color as the original image can be visually observed in the recorded or reproduced color image.

What is claimed is:

1. An image forming apparatus for reading an original color image on an image input medium having a first gamut, the gamut being defined as a color-reproducible range, to obtain a color image data representing an original color of the original color image for every picture element and then forming a color image on an image output medium having a second gamut on the basis of the color image data, comprising:

image inputting means for reading the original color image on the image input medium to input color image data of the original image therethrough;

image recording means for recording the color image on the image output medium on the basis of the color image data;

image input medium storage means for storing a gamut of each of a plurality of different image input media;

image medium indicating means for indicating a kind of the image input medium to output a compression-indicating signal representing a compression degree in an achromatic color direction for the input color image data in accordance with the stored gamut of the image input medium; and color-correcting means having a color-compression unit for color-compressing the color image data of the original color image in the achromatic color direction on the basis of the compression degree indicated by said compression indicating signal to convert the color image data of the original image to a color image data representing a recording color, the recording color being within the gamut of the image output medium and having the same hue as the original color, and for outputting the converted color image data to said image recording means as the color image data, whereby a color-compression processing is performed.

2. The image forming apparatus as claimed in claim 1, wherein said image inputting means comprises a solid-state image pick-up element for converting an optical image of the original color image into an electrical image thereof, and a filter unit for separating the optical image into three color components.

3. The image forming apparatus as claimed in claim 1, wherein said image recording means comprises an electrophotographic means using cyan, magenta and yellow color toners.

4. The image forming apparatus as claimed in claim 1, wherein said image medium indicating means comprises an operation panel having thereon a selecting key for selecting one of various kinds of image input media.

5. The image forming apparatus as claimed in claim 1, wherein said color-compression unit carries out the color-compression processing for the color image data of the original image when the original color represented by the color image data is out of a gamut having a predetermined achromatic color at a center thereof and a boundary having a predetermined color difference from the center thereto in a color space.

6. The image forming apparatus as claimed in claim 1, wherein said color-correcting unit comprises a matrix transforming unit for converting the color-compressed color image data into a color-corrected image data using a matrix representing color-correcting coefficients.

7. The image forming apparatus as claim 1, further comprising observing environment selecting means for indicating an observing environment under which the recorded color image on the image output medium is observed, to output a signal representing a color-correction degree for the input color image data to said color-correcting means.

8. The image forming apparatus as claimed in claim 7, wherein the observing environment comprises an illumination with which the recorded color image is observed.

9. The image forming apparatus as claimed in claim 7, wherein said observing environment selecting means comprises an operation panel having thereon a selecting key for selecting one of various kinds of observing environments.

10. The image forming apparatus as claimed in claim 1, wherein said color-correcting means comprises a color-difference calculating means for obtaining a first color-difference (M1) between a color represented by the color image data and an achromatic color, a second color-difference (M2) between a boundary of the second gamut and the achromatic color, and a third color-difference (M3) between a boundary of the first gamut and the achromatic color, the first gamut being determined by said compression indicating signal, a judging means for judging whether or not the color-difference M1 with a predetermined color-difference, and a corrected color-difference calculating means for obtaining a corrected color-difference (M4) of the color image data, the corrected color-difference (M4) being within the second gamut, thereby outputting a color-corrected image data having a corrected color whose color-difference (M4) to the achromatic color is the corrected color-difference (M4).

11. The image forming apparatus as claimed in claim 10, wherein the predetermined color-difference is set to $0.7 \times M2$.

* * * * *